UNITED STATES PATENT OFFICE 2,516,831

ARSINE DERIVATIVES

Ewald Rohrmann, Indianapolis, Ind., assignor to Eli Lilly and Company, Indianapolis, Ind., a corporation of Indiana No Drawing. Application November 17, 1947, Serial No. 786,551

5 Claims. (Cl. 260—440)

My invention relates to derivatives of p-carbamidophenylarsine, and more particularly to those derivatives in which two organic radicals are attached to the arsenic atom through sulfur atoms.

The compounds of my invention, which may be called arsines, have the general formula

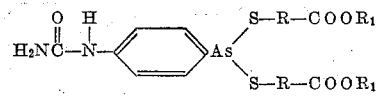

wherein R represents a methylene or an o-phenylene radical and $R_1$ represents hydrogen, a metallic or a metalline radical. In the form of their acids, the above-represented arsine compounds are white or substantially white amorphous solids and have indefinite melting points. The metal salts of the acids, with few exceptions, likewise are white compounds of indefinite melting points. Salts prepared from the common metals of low molecular weight, for example the sodium, potassium and calcium salts, are water-soluble as are the salts formed from metalline radicals such as the ammonium and substituted ammonium radicals.

My novel compounds may readily be prepared and isolated in their acid form as follows: A mixture of a thiol derivative, i. e., thiosalicylic or thioglycolic acid, and about one half of an equivalent of carbarsone oxide (prepared by the method of Doak et al., J. Am. Chem. Soc. 62, 3013, 1940), is suspended in an aqueous solution containing a reagent having alkaline properties, for example, a water-soluble metal hydroxide, carbonate or bicarbonate. The aqueous suspension is heated until the thiol derivative has reacted with the carbarsone oxide and the reaction is complete. The reaction mixture is then cooled to room temperature and the desired reaction product is precipitated from the solution by the addition of an acid such as any strong organic or mineral acid which will not yield a precipitate with the metal ion of the alkaline reagent used in the reaction. The precipitated material, which is the desired arsine compound, is separated by filtration, and dried.

The salts of the new arsine compounds may be prepared by the methods known to the art, for example, by treating a suspension of the acid form of the compound in water with an aqueous solution of an equivalent amount of alkali. Water-insoluble salts so prepared may be isolated by filtration, and water-soluble salts may be isolated by evaporating the aqueous solution to dryness.

The compounds of my invention are effective amebicides and are of value in the treatment of amebic dysentery and other protozoan-caused diseases. For such purpose they may be administered orally either in acid or salt form. My compounds are of the same order of in vitro activity as the alkaloid emetine which is widely used in the treatment of amebiasis despite its high toxicity and the deleterious side effects resulting from its use. In comparison with emetine, my compounds are not only more readily available, but are far less toxic and injurious to the patient receiving treatment. My compounds possess marked advantages over carbarsone in that they possess greater effectiveness but cause no appreciable irritation of the gastric mucosa or the peritoneum. Oral administration of my compounds to individuals infected with Endamoeba histolytica, the causative agent of amebiasis, has resulted in prompt disappearance of the organism and relief from clinical symptoms.

The following specific examples illustrate more fully the preparation of the compounds of my invention.

EXAMPLE 1

*Preparation of di-(2-carboxyphenylthio)-p-carbamidophenylarsine*

42 g. of sodium bicarbonate are dissolved in one liter of water. 81 g. of thiosalicylic acid (of 92 percent purity) and 56.5 g. of carbarsone oxide are added and the mixture is heated on a steam bath for 30 minutes. The reaction mixture is then cooled and filtered to remove a small amount of insoluble material. The filtrate is diluted with about 600 cc. of water and is acidified with concentrated hydrochloric acid. The precipitate of di-(2-carboxyphenylthio)-p-carbamidophenylarsine in practically quantitative yield which results, is filtered off and washed well with water. The material may be purified by dissolving it in sodium bicarbonate solution and reprecipitating it with hydrochloric acid. The precipitate is separated by filtration, washed with water and dried at about 80° C.

The reaction whereby the di-(2-carboxyphenylthio)-p-carbamidophenylarsine is formed may be represented by the following equation:

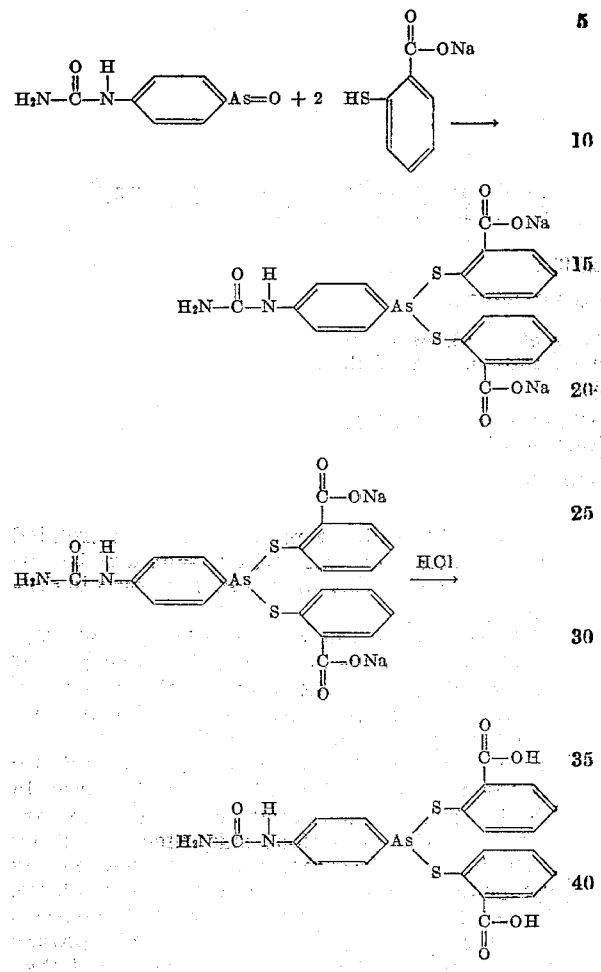

Di-(2-carboxyphenylthio)-p-carbamidophenarsine so prepared weighed about 135 g. and contained about 14.75 percent arsenic as compared with a theoretical amount of 14.51 percent.

The sodium salt of di-(2-carboxyphenylthio)-p-carbamidophenylarsine is prepared by treating an aqueous suspension of the arsine with an equivalent amount of sodium bicarbonate and evaporating the solution to dryness. The sodium salt thus prepared is a substantially white solid.

EXAMPLE 2

*Preparation of di-(carboxymethylthio)-p-carbamidophenylarsine*

121 g. of thioglycolic acid and 100 g. of carbarsone oxide are reacted in a solution of 128 g. of sodium bicarbonate in 2 liters of water, according to the procedure described in Example 1. On treating the reaction mixture with acid, di-(carboxymethylthio)-p-carbamidophenylarsine precipitates, and is separated by filtration and dried. Di-(carboxymethylthio)-p-carbamidophenylarsine thus prepared was obtained as a white amorphous solid, soluble in dilute alkali. It contained about 19.65 percent of arsenic as compared with the calculated amount of 19.09 percent.

The reaction whereby the di-(carboxymethylthio)-p-carbamidophenylarsine is formed may be represented by the following equation:

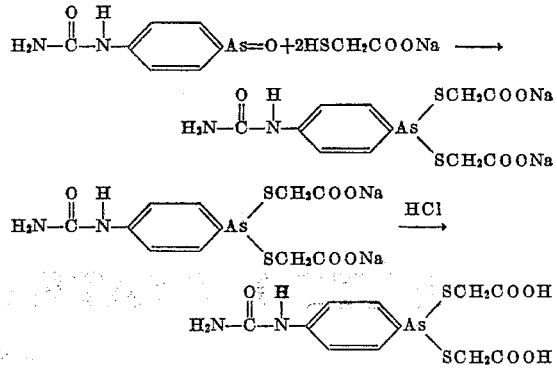

I claim:

1. A compound selected from the class consisting of di-(2-carboxyphenylthio)-p-carbamidophenylarsine, di-(carboxymethylthio)-p-carbamidophenylarsine, and the sodium, potassium, calcium and ammonium salts thereof.

2. Di-(2-carboxyphenylthio)-p-carbamidophenylarsine represented by the following formula

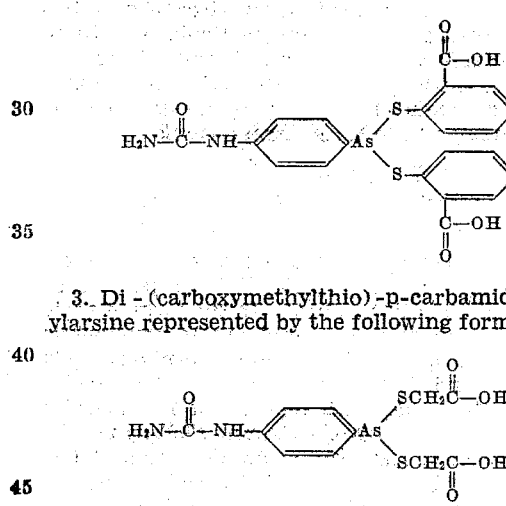

3. Di-(carboxymethylthio)-p-carbamidophenylarsine represented by the following formula

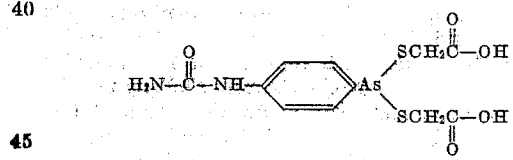

4. The disodium salt of di-(2-carboxyphenylthio)-p-carbamidophenylarsine represented by the following formula

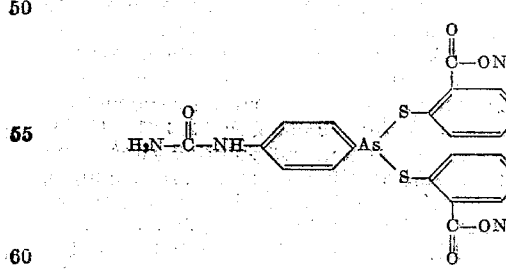

5. The disodium salt of di-(carboxymethylthio)-p-carbamidophenylarsine represented by the following formula

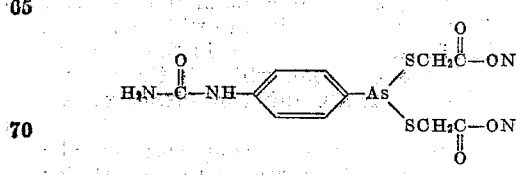

EWALD ROHRMANN.

(References on following page)

REFERENCES CITED

The following references are of record in the file of this patent:

UNITED STATES PATENTS

| Number | Name | Date |
|---|---|---|
| 1,677,392 | Kharasch | July 17, 1928 |
| 2,331,833 | Hamilton | Oct. 12, 1943 |

OTHER REFERENCES

Cohen et al., "J. Chem. Soc. (London)," vol. 1931, pages 3043–3057.

Doak et al., "J. Am. Chem. Soc.," vol. 62, (1940), pages 3012–3013.